May 19, 1925.

K. O. LEON 1,538,564

BALL CAGE FOR ANTIFRICTION THRUST BEARINGS

Filed March 2, 1920

Inventor
K. O. Leon,
By H. R. Kerslake
Attorney

Patented May 19, 1925.

1,538,564

UNITED STATES PATENT OFFICE.

KARL OSKAR LEON, OF STOCKHOLM, SWEDEN, ASSIGNOR, BY MESNE ASSIGNMENTS, TO NYA NORDISKA KULLAGER AKTIEBOLAGET, OF GOTTENBORG, SWEDEN.

BALL CAGE FOR ANTIFRICTION THRUST BEARINGS.

Application filed March 2, 1920. Serial No. 362,860.

*To all whom it may concern:*

Be it known that I, KARL OSKAR LEON, a citizen of Sweden, residing at Stockholm, in the county of Stockholm and State of Sweden, have invented certain new and useful Improvements in Ball Cages for Antifriction Thrust Bearings, of which the following is a specification.

This invention relates to anti-friction thrust bearings, and more particularly to ball cages for such bearings, and has for its object to provide a ball cage, which can be easily removed from the shaft in order to be inspected or repaired without removing the whole bearing.

This invention consists in a ball cage, the body of which is radially divided into segments, each of which may be loosened from the surrounding ring of the cage and be removed by first moving the loosened segment axially until it has disengaged the surrounding ring, and then moving said segment radially away from the shaft.

The accompanying drawing discloses an embodiment of the said invention.

In the drawing:—

Figure 1:
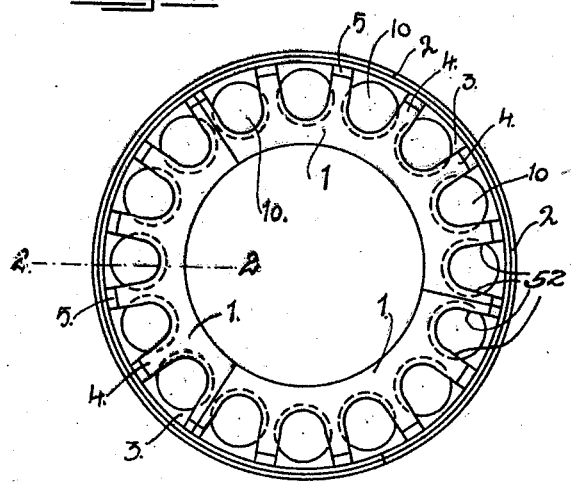
Fig. 1 is an axial view of the complete ball cage.

The ball cage according to the present invention includes a body or ring 1 divided radially into two or more segments which are held together by means of a surrounding or external one-piece ring 2. As shown, the ring or body 1 is of U-shape in cross section and provided with recesses 3 cut inwardly from the periphery of the ring and adapted to hold the balls 10. The intermediate tongues 4 left between the recesses 3 are bent to form axially directed feet or flanges 5 adapted to rest against the inner surface of the one-piece ring 2, which holds the parts of the ring 1 together to form the cage. The flanges 5 may be fastened to the ring 2 by any suitable fastening means such as bolts, screws or similar fastening elements (not shown).

The recesses 3 are of such depth radially that the balls 10 are permitted to move a short distance radially outward when the cage is in use.

Figure 3:
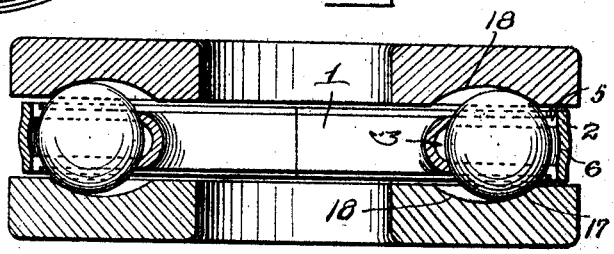
Fig. 3 is a diametrical section of a bearing with a cage of the type shown in Figs. 1 and 2.

As shown in Fig. 3, the locations of the recesses 3 measured radially from the center of the bearing to the bottom of the recesses, is such that the locus of the contact points 17—17 between the balls and the raceways in the race-rings of the bearing, does not coincide with the center line 18—18 of the raceway grooves, but is arranged farther away from the center of the bearing in order to lessen the pressure of the balls against the cage during running. To stiffen the cage, it is advisable to make the surrounding ring 2 somewhat wave-shaped as shown at 6.

Figure 2:
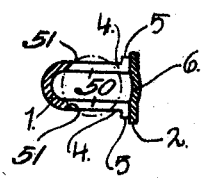
Fig. 2 is a radial section through a portion of the cage on the line 2—2 of Fig. 1.

It will be noted in Fig. 2, that the edges 50 of the recessed portion of the upper and lower parts of the ring 1, are inclined or curved as shown at 51, to accord with the curvature of the balls. From Fig. 1 it will be seen that these inclined or curved portions of the recesses extend outwardly beyond the center of the balls to the points 52, so that these inclined or curved surfaces of the recesses will retain the balls in position, even when segments of the ring 1 are removed from the ring 2. Consequently, when the one segment of the ring 1 is removed from the shaft, the balls carried by the segment will be detached with the segment and the balls of the other segments will not fall out of their recesses.

As before stated the flanges or feet 5 are fastened to the ring 2 by any suitable means, and for the purpose of removing one of the segments with the balls which it carries, it is of course necessary to first remove such fastening means. Then the segment to be detached, is first moved axially until it is clear of the ring 2, and then this segment may be moved radially away from the shaft.

What I claim as new is:

1. In a bearing, an inner ring divided radially into a plurality of segments, each segment being provided with radial recesses, balls arranged in said recesses, and a one-piece ring surrounding the segmental ring and adapted to normally retain said segments in position, each segment being removable from the surrounding ring by first moving the segment axially clear of the surrounding ring and then radial.

2. A bearing of the kind claimed in claim 1 in which the walls of said recesses are curved to conform to the surfaces of the balls and are extended outwardly a sufficient distance to retain the balls in the recesses when the complete ring is removed from the segmental ring.

3. An axial thrust bearing comprising oppositely disposed race-rings having curved grooves arranged in their oppositely disposed surfaces, a ball cage arranged between said race-rings and provided with radially disposed recesses, and balls arranged in said recesses and engaging said grooves, the balls being so disposed relatively to said grooves that a circular line passing through the centers of the balls will have a greater radius than a circular line drawn along the deepest part of the grooves.

In testimony whereof I have fixed my signature.

KARL OSKAR LEON.